US008999118B2

(12) United States Patent
Tabakovic et al.

(10) Patent No.: US 8,999,118 B2
(45) Date of Patent: Apr. 7, 2015

(54) FORMATION OF NON-MAGNETIC GROOVES

(71) Applicant: Seagate Technology LLC, Cupertino, CA (US)

(72) Inventors: Ibro Tabakovic, Edina, MN (US); Steve Riemer, Minneapolis, MN (US); Jie Gong, Eden Prairie, MN (US); Mark Thomas Kief, Lakeville, MN (US); Ming Sun, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/835,544

(22) Filed: Mar. 15, 2013

(65) Prior Publication Data

US 2013/0202915 A1 Aug. 8, 2013

Related U.S. Application Data

(62) Division of application No. 12/685,334, filed on Jan. 11, 2010, now Pat. No. 8,435,399.

(51) Int. Cl.
| | |
|---|---|
| *C25F 3/14* | (2006.01) |
| *C25D 5/02* | (2006.01) |
| *C25D 11/20* | (2006.01) |
| *C25D 11/34* | (2006.01) |
| *G11B 5/84* | (2006.01) |
| *G11B 5/858* | (2006.01) |
| *G11B 5/65* | (2006.01) |
| *B82Y 10/00* | (2011.01) |
| *G11B 5/74* | (2006.01) |
| *G11B 5/82* | (2006.01) |
| *G11B 5/855* | (2006.01) |

(52) U.S. Cl.
CPC ... *G11B 5/84* (2013.01); *C25F 3/14* (2013.01); *B82Y 10/00* (2013.01); *C25D 5/022* (2013.01); *C25D 11/20* (2013.01); *C25D 11/34* (2013.01); *G11B 5/743* (2013.01); *G11B 5/82* (2013.01); *G11B 5/855* (2013.01); *G11B 5/858* (2013.01); *G11B 5/656* (2013.01)

(58) Field of Classification Search
None
See application file for complete search history.

(56) References Cited

U.S. PATENT DOCUMENTS

| | | | | |
|---|---|---|---|---|
| 5,616,218 | A * | 4/1997 | Alex | 204/192.15 |
| 7,935,242 | B2 * | 5/2011 | Klein et al. | 205/657 |
| 2006/0222898 | A1 * | 10/2006 | Ichihara | 428/826 |
| 2007/0089994 | A1 * | 4/2007 | Zhou | 205/264 |
| 2008/0241595 | A1 * | 10/2008 | Kimura et al. | 428/800 |

* cited by examiner

*Primary Examiner* — Nicholas A Smith (57) ABSTRACT

A method is disclosed for defining discrete magnetic and non-magnetic regions on the magnetic film layer of a storage media substrate. The method applies anodic oxidation of a cobalt-containing magnetic film layer to remove cobalt, followed by controlled deposition of a non-magnetic matrix into the regions where the cobalt has been removed. Deposition may either be electrodeposition, collimated vacuum deposition, or other methods depending upon the composition of the non-magnetic matrix being deposited. The method may be performed in a single electrochemical cell.

20 Claims, 7 Drawing Sheets

FORMATION OF NON-MAGNETIC GROOVES

This application is a division of U.S. patent application Ser. No. 12/685,334 filed on Jan. 11, 2010, now U.S. Pat. No. 8,435,399, the disclosure of which is hereby incorporated by reference in its entirety.

FIELD

This disclosure relates generally to the formation of patterned media or discrete track media for use in storage media. Specifically, this disclosure relates to the deposition of a non-magnetic matrix to form patterned media or discrete track media.

BACKGROUND

Bit patterned media (BPM) and discrete track media (DTR) are becoming more popular media for storage because of their inherent abilities to store more data in a smaller area. The goal of BPM and DTR and other patterned media is to increase bit density. However, manufacturing methods for BPM and DTR are complicated, expensive and inconsistent.

BPM media are typically formed by using lithography to define the pattern on the media substrate. Once the pattern is defined, the translation of the pattern to the media substrate is typically an additive or subtractive process. An additive process, e.g., electrodeposition and lift-off, requires steps of creating a resist pattern and then depositing a magnetic film layer. In contrast, the subtractive process begins with the deposition of a magnetic film layer followed by resist patterning. The resist pattern may serve as an etch mask such that the surrounding magnetic film may be removed by ion milling, reactive ion etching (RIE), wet chemical etching or other processes. An issue with these types of etching is that they are not very selective in defining magnetic and non-magnetic regions on the magnetic film layer. As a result, etching does not always result in consistently higher bit densities.

Other methods have been reported with varying results. For example, focused ion beams (FIB) poisoned with gallium ($Ga^+$) have been used in order to created discrete magnetic islands (also referred to as "dots" or "bits") smaller than 70 nm in diameter. However, magnetic film layer modification using FIB is not readily scalable to mass production.

What is therefore needed is a way to define discrete magnetic and non-magnetic regions on a magnetic film layer that is both efficient and scalable to mass production.

BRIEF DESCRIPTION OF THE FIGURES

Embodiments of this disclosure are illustrated by way of example and not limitation in the figures of the accompanying drawings, in which like references indicate similar elements, and in which.

SUMMARY OF THE DISCLOSURE

An embodiment includes a method for forming patterned media by selectively oxidizing a cobalt-containing magnetic film layer on a medium substrate, then depositing or "backfilling" a non-magnetic matrix in the regions of the cobalt-containing magnetic film layer where the cobalt was removed. An embodiment includes an electrochemical cell for selectively oxidizing a cobalt-containing magnetic film layer to remove cobalt, and then backfilling the removed cobalt with a non-magnetic matrix.

DETAILED DESCRIPTION

Figure 1:
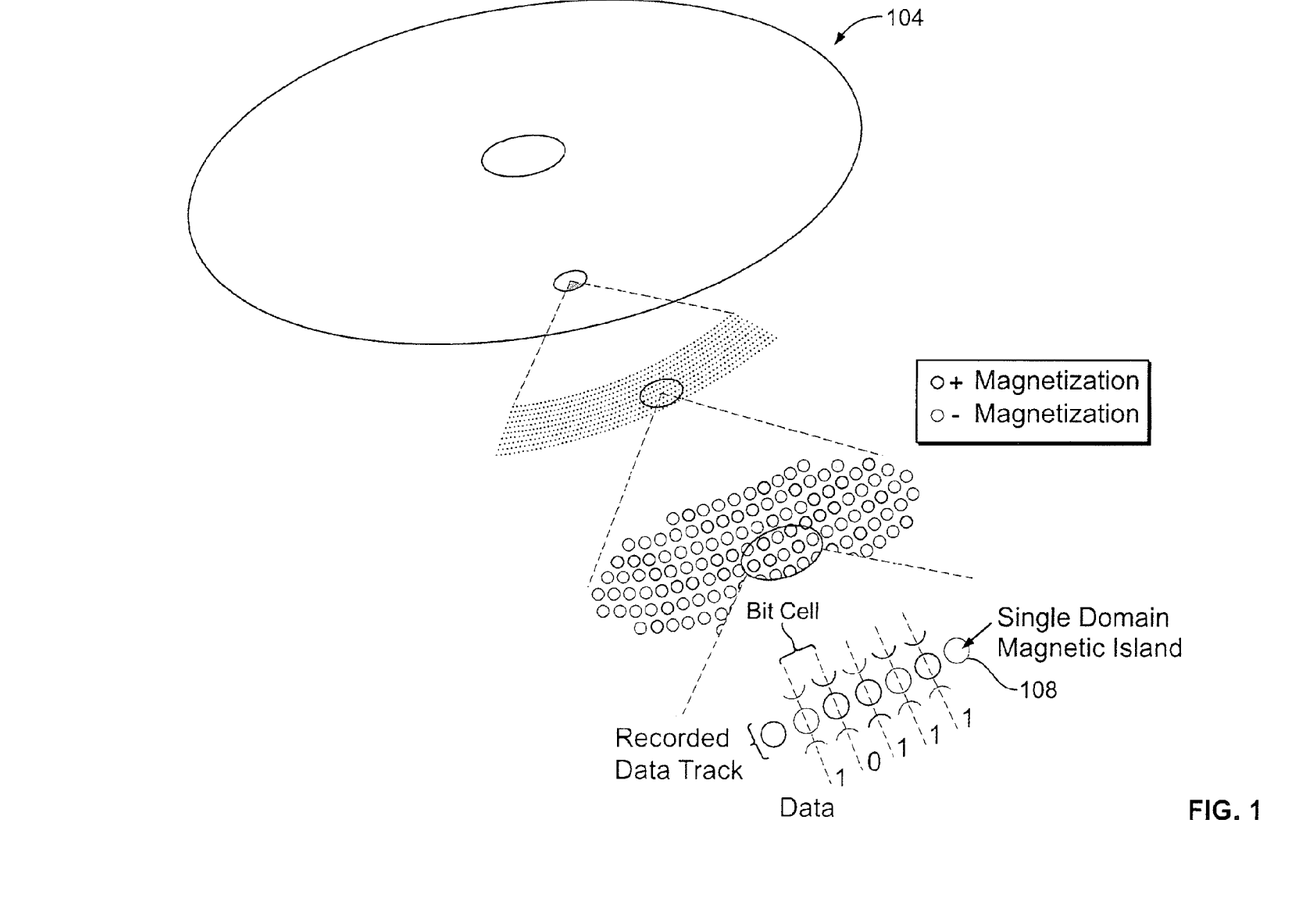
FIG. 1 is a perspective view of individual bit cells in a bit-patterned media.

A method for forming patterned media is disclosed herein. The patterned medium is formed by selective anodic oxidation of a cobalt-containing magnetic film layer on the medium substrate, then depositing or backfilling a non-magnetic matrix in the regions of the cobalt-containing magnetic film layer where cobalt was removed. By way of example, FIG. 1 depicts an exemplary storage medium 104 comprising an array of magnetic dots 108 in a magnetic film layer. Each magnetic dot 108 is capable of storing a single bit of information. A typical magnetic film layer may be comprised of cobalt (Co) and platinum (Pt).

Figure 2:
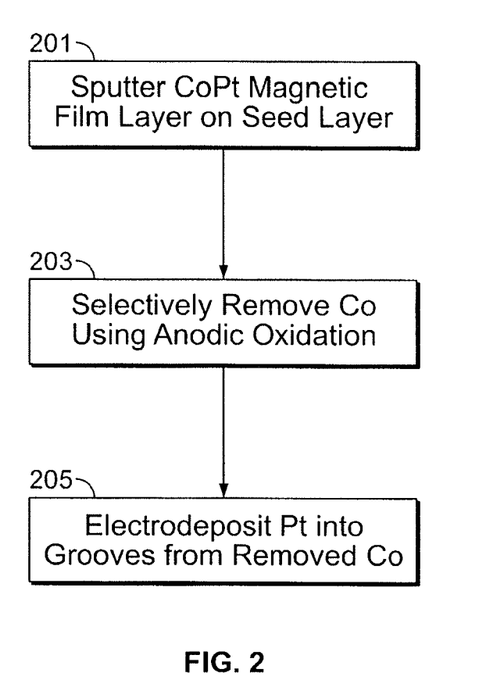
FIG. 2 is an exemplary flow diagram illustrating the steps of an embodiment of the disclosure.

FIG. 2 is a flowchart illustrating the steps of an exemplary oxidation-reduction method in which the removal of cobalt from the media substrate and backfilled with a non-magnetic matrix in a single electrochemical cell, or "one-pot" method. As will be explained further below, the progress of the reaction may be attenuated by lowering the current applied to the single electrochemical cell. In FIG. 2, the electrochemical cell contains an electrolyte solution comprised of $H_2PtCl_6$, $H_3BO_3$ and $NH_4Cl$. The $PtCl_6^{-2}$ species in the electrolyte solution may act as the oxidizing agent while at the same time providing the Pt species for the non-magnetic matrix. In an embodiment, the pH level of the electrolyte solution is 5.0.

Figure 3:
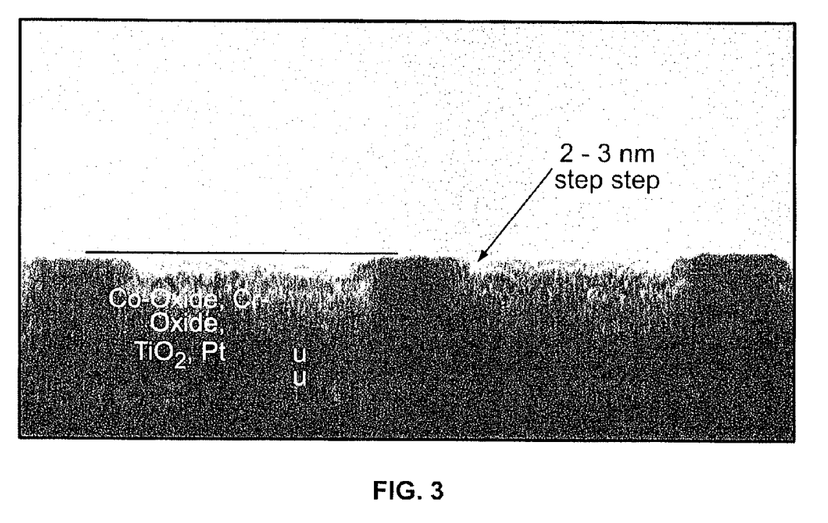
FIG. 3 is an image illustrating an embodiment.

In block 201 of FIG. 2, a CoPt magnetic film is sputter or otherwise deposited onto a seed layer of a media substrate. The seed layer may be a ruthenium (Ru) seed layer or other equivalent layer. In block 203 of FIG. 2, Co is selectively removed from the magnetic film layer by selective anodic oxidation by lowering the current or potential in the electrolyte solution. This step may also be referred to herein as "anodic removal" or "AR." AR will leave tracks or bits of 1.0-5.0 nm in the magnetic layer where CoPt is left behind, and grooves or trenches in the magnetic layer where Co has been selectively removed. FIG. 3 is an example of a transmission electron microscopy ("TEM") image of DTR media in which Co has been selectively removed from the magnetic film layer, leaving behind a 2.0-3.0 nm groove. One skilled in the art will appreciate that when viewed through a scanning electron microscope ("SEM"), a top-down view of DTR media which has had Co selectively removed using AR will show less dense, more porous, labyrinth-like microstructures in the areas exposed to AR as compared to the areas not exposed to AR.

Figure 4:
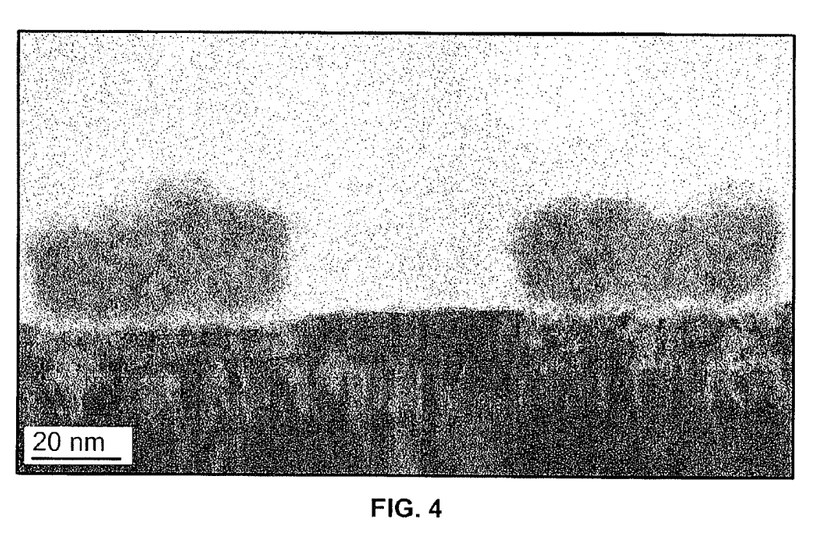
FIG. 4 is an image illustrating an embodiment.

One skilled in the art will appreciate that removing Co from a CoPt-containing magnetic film layer may leave Pt remaining in the grooves or trenches. This may be confirmed by observation with a cross-sectional TEM and nano-energy dispersive X-ray spectrometer ("nano-EDX"), in which the grooves or trenches may show a strong Pt signal as compared to areas not exposed to AR. One will appreciate that as a result of the remaining Pt, the interface between the CoPt bits and the exposed Pt layer may form a galvanic cell that can enhance the corrosion rate of the remaining CoPt between anodic oxidation and the following rinsing or drying steps. However, because the method of FIG. 2 occurs in a single electrochemical cell, the opportunity for CoPt corrosion is significantly reduced. In block 205 of FIG. 2, the Pt in solution will be electrodeposited into the grooves left from the removed Co from block 203 of FIG. 2. FIG. 4 is a TEM image of DTR media in which an overabundance (~20 nm) of Pt has been elecrodeposited into the grooves. One will appreciate that the excess Pt may be stripped in order to provide a substantially flat media surface.

One skilled in the art will also appreciate that removing Co from a CoPt-containing magnetic film layer using an oxidation process may leave a non-conductive oxidized film in the groove, as shown in FIG. 3. This may inhibit electrodeposition, since it is generally preferred that the surface upon which electrodeposition takes place be generally conductive. In order to encourage electrodeposition of Pt into the grooves, the medium may require pretreatment, such as pre-wet cleaning, chemical activation, cathodic reduction or other methods. Pretreatment may ensure that the surface of the grooves is generally conductive and the surface of the tracks or bits is non-conductive.

Figure 5:
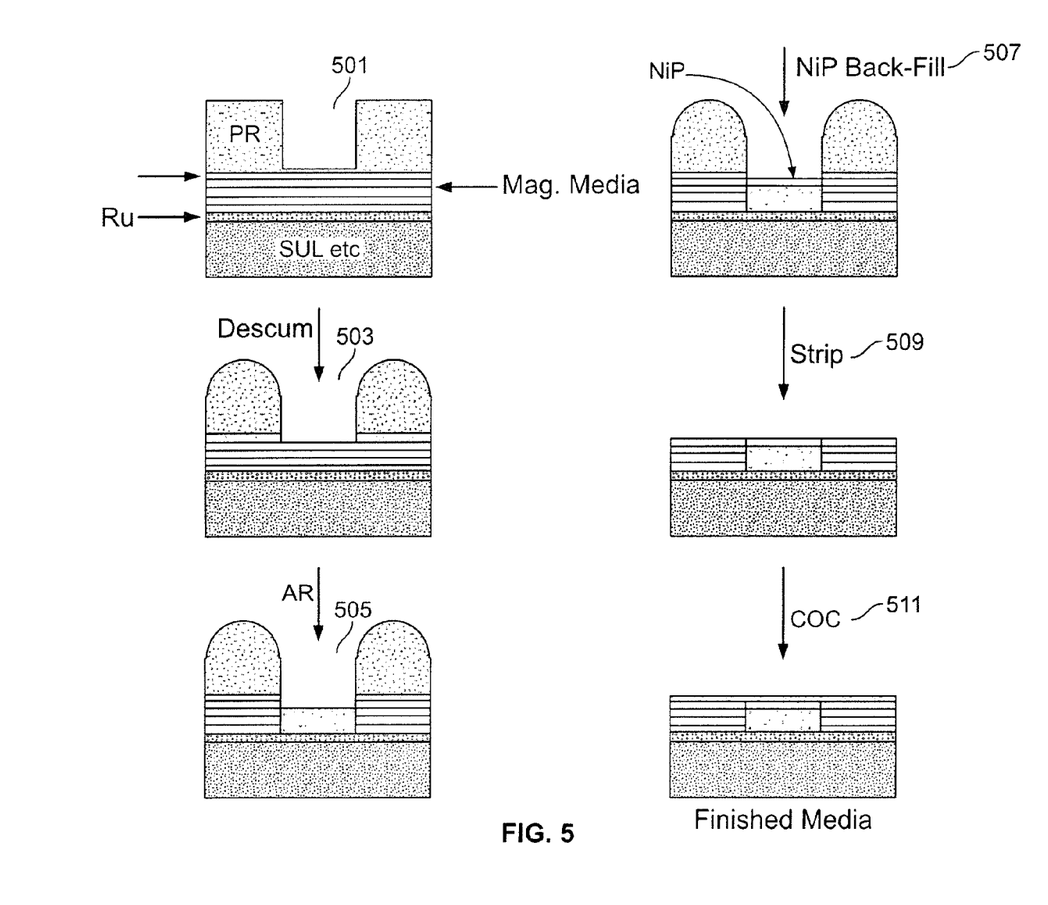
FIG. 5 is a cross-sectional view of a medium undergoing a method embodiment.

FIG. 5 is a cross-sectional view of a medium undergoing the method of FIG. 2. In block 501 the media substrate may comprised of a photoresist ("PR") layer, a magnetic layer and one or more underlayers beneath the magnetic layer. The media substrate may be descummed in block 503 in order to remove foreign contaminants or residue. In block 505 of FIG. 5, the media substrate undergoes AR as described in block 203 of FIG. 2. In block 507 of FIG. 5, the trench or groove left from the AR process may be backfilled with the electrodeposition of Pt, NiPt ("NiP") or other platinum-containing compounds. In block 509 of FIG. 5, the media substrate may be stripped to form a substantially flat surface. In block 511 of FIG. 5, the carbon overcoat ("COC") may be deposited onto the media substrate.

Figure 6:
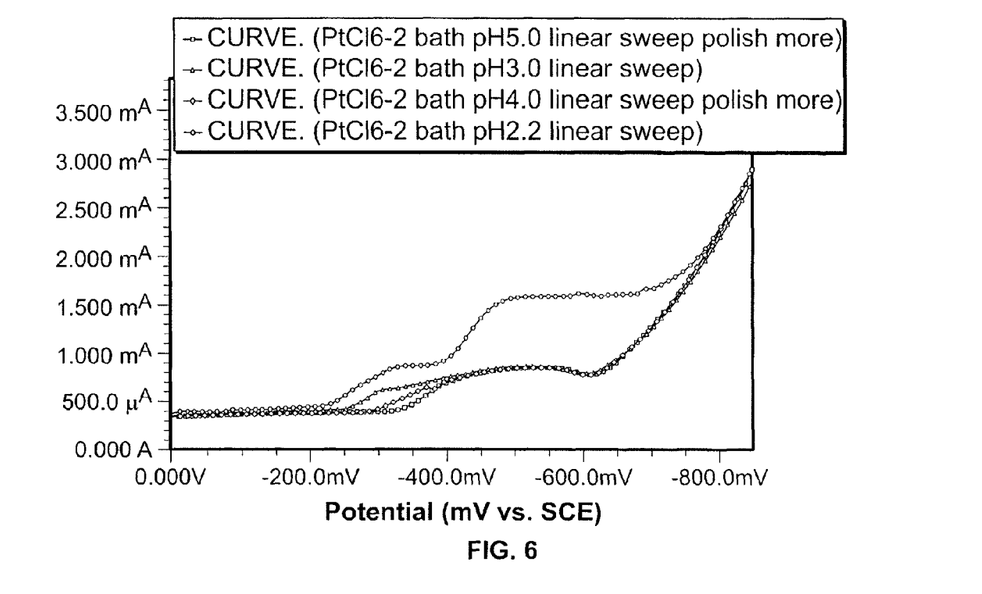
FIG. 6 is an exemplary chart illustrating an embodiment.
Figure 7:
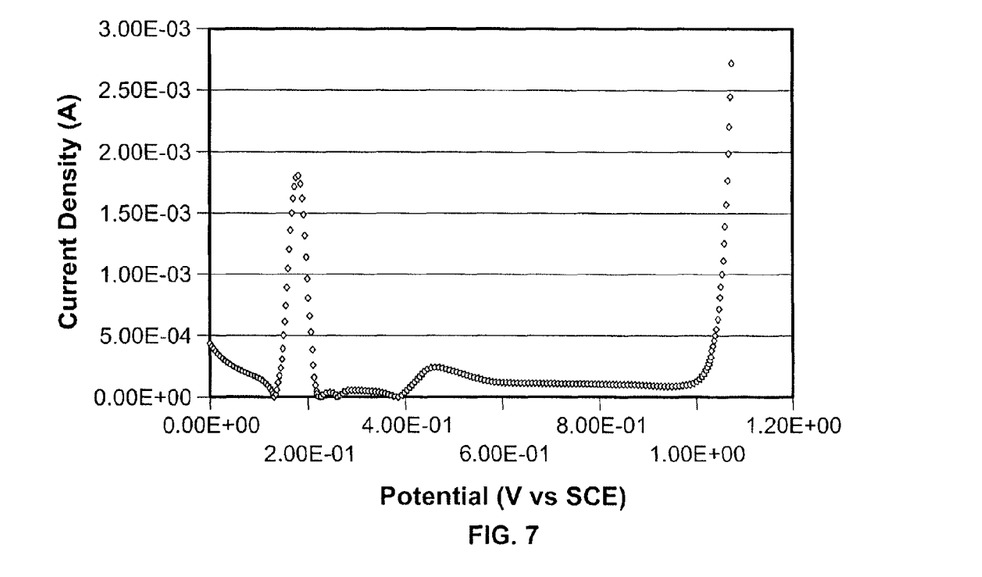
FIG. 7 is an exemplary chart illustrating an embodiment.
Figure 8:
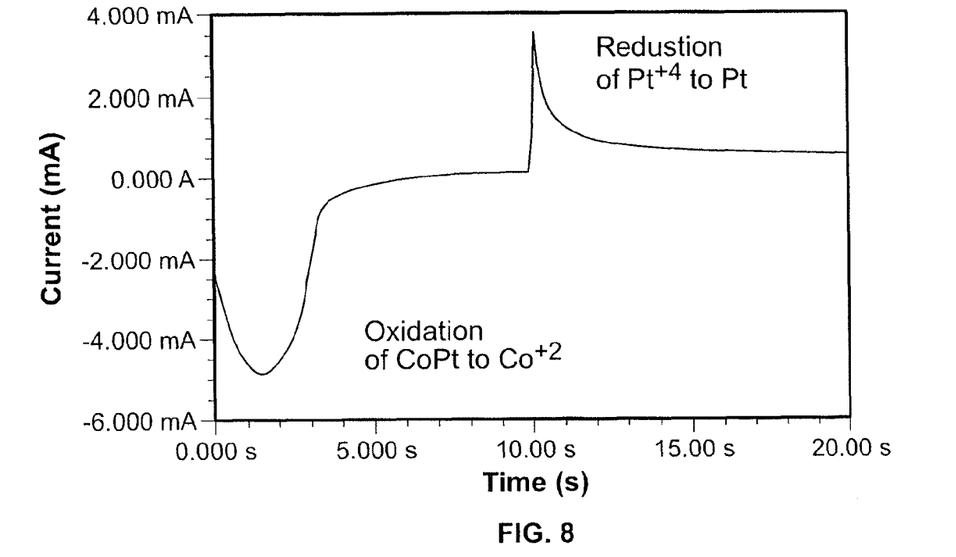
FIG. 8 is an exemplary chart illustrating an embodiment.

As mentioned previously, the progress of the electrolyte reaction may be controlled by lowering the electric potential (measured in volts (V) vs. saturated calomel electrode (SCE)). One skilled in the art will appreciate that the voltages applied in the examples disclosed herein are merely exemplary and that other ranges are possible without departing from this disclosure or the scope of the appended claims. For example, FIG. 6 is a chart of a rotating disc electrode (RDE) voltammetry study run in $H_2PtCl_6$ solution at a range from pH 2.0 to pH 5.0, and illustrates that Pt may be deposited at potentials more negative than −0.4 V vs. SCE (shown as −400.0 mV in FIG. 4). As shown, FIG. 7 illustrates that selective anodic removal of Co from CoPt in an $H_2PtCl_6$ solution having a pH of 5.0 occurs at a peak potential of $E_p$=0.018 V vs. SCE. Pt oxidation can occur at $E_p$=0.45 V vs. SCE. One will appreciate that the rate of reaction may also be controlled by varying potential. In an embodiment, the method illustrated in FIG. 2 may be completed in 20 seconds. During the first 10 seconds at +0.3 V vs. SCE, selective removal of Co from the CoPt magnetic layer occurs by anodic oxidation. During the second 10 seconds, when potential is stepped to −0.4 V vs. SCE, $Pt^{4+}$ is reduced to Pt and electrodeposited into the trenches left by the removed Co. This rate of reaction is illustrated in the chart of FIG. 8.

One will appreciate that electrodeposition may be used to backfill other non-magnetic matrices containing other metals besides Pt. For example, a metal or alloy containing Pt, Ru, Ni, P, Cu, NiPt, CuNi, etc., may be electro-deposited into the trenches formed by the anodic removal of Co in block 203 of FIG. 2. electrodeposition may be more desirable than other deposition methods, such as vacuum deposition, since it may provide an even deposition of certain non-magnetic matrices without disturbing the tracks or bits left from the oxidation step. As a result, a low cost media fabrication process is provided because the need for post backfill lift-off or other CMP processes is obviated.

Even though electrodeposition may be a preferred method for backfilling the magnetic layer, one will appreciate that vacuum deposition methods may be used as well. For example, if a media manufacturer wants to use a metal or alloy containing Cr, Ta, NiTa, Ni, Ti and/or Cu, or use other non-magnetic matrices, it may employ alternative methods without departing from the scope of the appended claims or this disclosure. FIG. 3 illustrates a method using collimated vacuum deposition of Cr. In the method of FIG. 3, the anodic oxidation step may not occur in the same reaction vessel, or "one-pot" as the deposition step because it requires different conditions.

Figure 9:
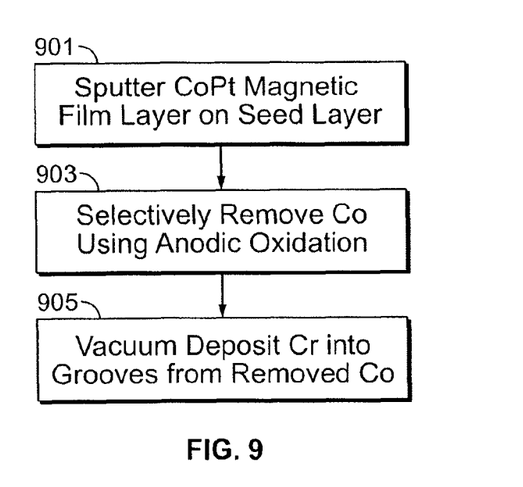
FIG. 9 is an exemplary flow diagram illustrating the steps of an embodiment.

In block 901 of FIG. 9, a CoPt magnetic film is sputter deposited onto a seed layer, which may be a Ru seed layer or other equivalent layer. In block 903 of FIG. 9, Co is selectively removed from the magnetic film layer by selective anodic oxidation to leave tracks or bits in the magnetic layer where CoPt is left behind, and grooves or trenches in the magnetic layer where Co has been selectively removed. In block 905 of FIG. 9, Cr is deposited into the trenches using collimated vacuum deposition techniques.

Figure 10:
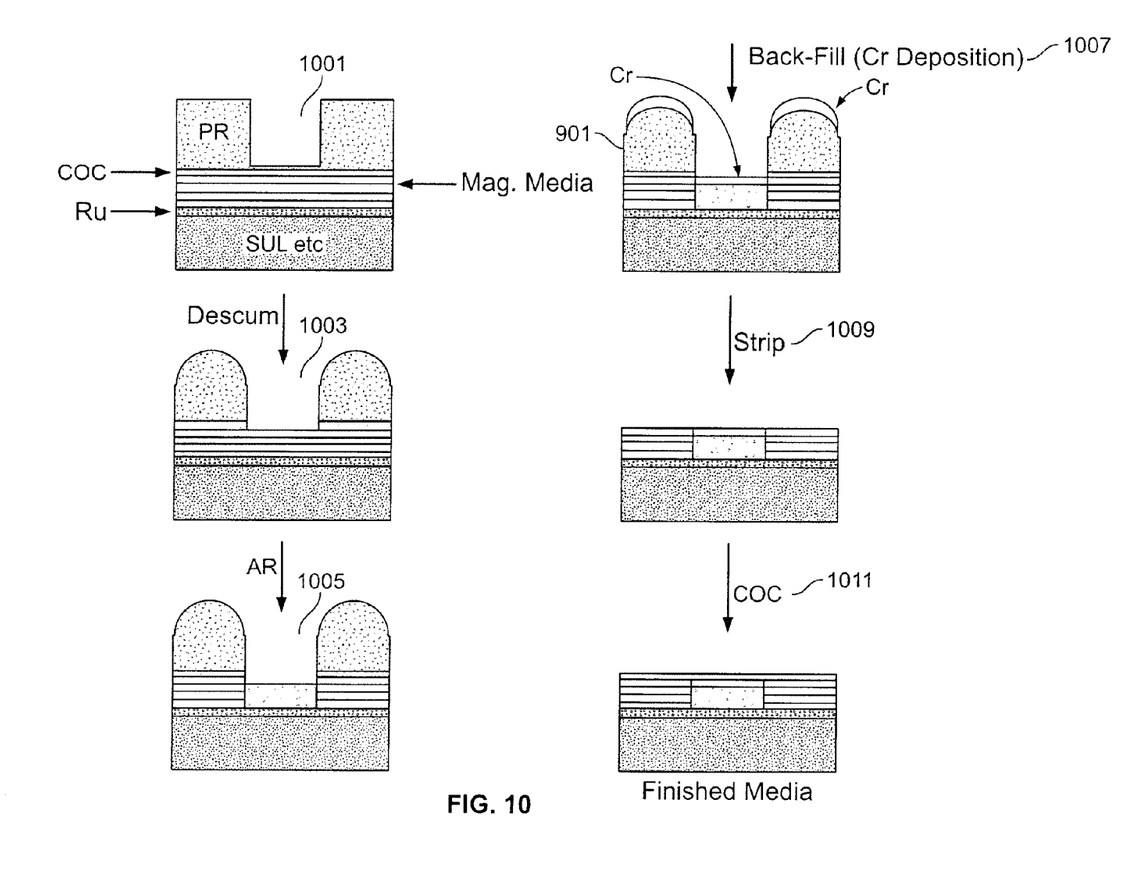
FIG. 10 is a cross-sectional view of a medium undergoing a method embodiment.

FIG. 10 is a cross-sectional view of a medium undergoing the method of FIG. 9. FIG. 10 is similar to FIG. 5, except that Cr is deposited using collimated vacuum deposition rather than electrodeposition. In block 1001, the media substrate may comprised of a photoresist ("PR") layer, a magnetic layer and one or more underlayers beneath the magnetic layer. The media substrate may be descummed in block 1003 in order to remove foreign contaminants or residue. In block 1005 of FIG. 10, the media substrate undergoes AR as described in block 903 of FIG. 9. In 1007 of FIG. 10, the trench or groove left from the AR process may be backfilled with the collimated vacuum deposition of Cr. In block 1009 of FIG. 10, the media substrate may be stripped to form a substantially flat surface. In block 1011 of FIG. 10, the carbon overcoat ("COC") may be deposited onto the media substrate.

One will appreciate that the methods describe herein disclose methods for controlled deposition into a trench formed by anodic oxidation of a cobalt-containing magnetic film layer. Because the deposition is controlled, little to no planarization of the magnetic film layer is required following deposition. This offers a significant advantage over milled (IBE) patterned media which typically has a trench depth of about 20 nm.

According to an embodiment, a result of one or more of the methods described above is a cobalt-containing magnetic film layer overlaying a medium substrate, the cobalt-containing magnetic film layer containing a plurality of magnetic portions separated from each other by a nonmagnetic matrix. One will appreciate that the magnetic film layer does not have to be directly deposited upon or in contact with the medium substrate, and the magnetic film layer may be separated from the underlying medium substrate by one or more interlayers. Using one or more of the methods described above, the nonmagnetic matrix may comprise an electrodeposited metal selected from the group consisting of platinum, ruthenium, nickel and copper. In addition, the nonmagnetic matrix may comprise a vacuum deposited metal selected from the group consisting of chromium, tantalum and nickel.

One will appreciate that in the description above and throughout, numerous specific details are set forth in order to provide a thorough understanding. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions. One will appreciate that these steps are merely exemplary and are not meant to be limiting in any way. Other steps and functions may be contemplated without departing from this disclosure or the scope of the appended claims.

What is claimed is:

1. A method comprising: selectively removing cobalt from one or more of portions of a cobalt-containing magnetic film layer on a surface of a substrate using a first electrolyte solution, the substrate comprising a resist layer over the cobalt-containing magnetic film, the resist layer comprising one or more pattern features exposing one or more of the portions of the cobalt-containing magnetic film, wherein the removal of cobalt forms a groove in the cobalt-containing magnetic film layer; depositing a non-magnetic matrix in the groove using second electrolyte solution comprising a substantially similar electrolytic composition as the first electrolyte solution used for the selective removal of cobalt; controlling the rate of deposition of the non-magnetic matrix through application of an amount of current sufficient to adjust an electric potential of the second electrolyte solution; and controlling the rate of selective removal of cobalt through application of an amount of current sufficient to adjust an electric potential of the first electrolyte solution.

2. The method of claim 1, wherein selectively removing cobalt comprises performing anodic removal.

3. The method of claim 1, wherein the second electrolyte solution comprises a $H_2PtCl_6$ solution.

4. The method of claim 1, wherein the non-magnetic matrix comprises platinum.

5. The method of claim 1, wherein depositing the non-magnetic matrix comprises depositing the non-magnetic matrix through electrodeposition and the deposited non-magnetic matrix comprises a metal or alloy selected from the group consisting of platinum, ruthenium, nickel, phosphorus, and copper.

6. The method of claim 1, wherein depositing the non-magnetic matrix comprises depositing the non-magnetic matrix through vacuum deposition and the deposited non-magnetic matrix comprises a metal selected from the group consisting of chromium, tantalum, titanium, nickel and copper.

7. An apparatus comprising: an electrochemical cell configured to selectively remove cobalt from an exposed portion of a cobalt-containing magnetic film of a substrate using a first electrolyte solution, the substrate comprising a resist layer over the cobalt-containing magnetic film, the resist layer comprising one or more pattern features exposing one or more portions of the cobalt-containing magnetic film, wherein the removal of cobalt forms a groove in the cobalt-containing magnetic film; and means for depositing a non-magnetic matrix in the groove using a second electrolyte solution comprising a substantially similar electrolytic composition as the first electrolyte solution used for the selective removal of cobalt, wherein the electrochemical cell is further configured to: control the rate of deposition of the non-magnetic matrix through application of an amount of current sufficient to adjust an electric potential of the second electrolyte solution, and control the rate of selective removal of cobalt through application of an amount of current sufficient to adjust an electric potential of the first electrolyte solution.

8. The apparatus of claim 7, wherein the electrochemical cell is configured to selectively remove cobalt through anodic removal.

9. The apparatus of claim 7, wherein the second electrolyte solution comprises a $H_2PtCl_6$ solution.

10. The apparatus of claim 7, wherein the non-magnetic matrix comprises platinum.

11. The apparatus of claim 7, wherein the means for depositing the non-magnetic matrix comprises the electrochemical cell performing the selective cobalt removal being further configured to perform electrodeposition and the non-magnetic matrix comprises a metal or alloy selected from the group consisting of platinum, ruthenium, nickel, phosphorus, and copper.

12. An apparatus comprising: a first electrochemical cell configured to selectively remove cobalt from an exposed portion of a cobalt-containing magnetic film of a substrate using a first electrolyte solution, the substrate comprising a resist layer over the cobalt-containing magnetic film, the resist layer comprising one or more pattern features exposing one or more portions of the cobalt-containing magnetic film, wherein the removal of cobalt forms a groove in the cobalt-containing magnetic film; and a second electrochemical cell operable to deposit a non-magnetic matrix the groove using a second electrolyte solution comprising a substantially similar electrolytic composition as the first electrolyte solution used for the selective removal of cobalt, wherein the first electrochemical cell is configured to control the rate of deposition of the non-magnetic matrix through application of an amount of current sufficient to adjust an electric potential of the second electrolyte solution, and wherein the second electrochemical cell is configured to control the rate of selective removal of cobalt through application of an amount of current sufficient to adjust an electric potential of the first electrolyte solution.

13. The apparatus of claim 12, wherein the first electrochemical cell is configured to selectively remove cobalt through anodic removal.

14. The apparatus of claim 12, wherein the second electrolyte solution comprises a $H_2PtCl_6$ solution.

15. The apparatus of claim 12, wherein the non-magnetic matrix comprises platinum.

16. The apparatus of claim 12, wherein the second electrochemical cell is configured to perform electrodeposition and the non-magnetic matrix comprises a metal or alloy selected from the group consisting of platinum, ruthenium, nickel, phosphorus, and copper.

17. An apparatus comprising: an electrochemical cell configured to selectively remove cobalt from an exposed portion of a cobalt-containing magnetic film of a substrate using a first electrolyte solution, the substrate comprising a resist layer over the cobalt-containing magnetic film, the resist layer comprising one or more pattern features exposing one or more portions of the cobalt-containing magnetic film, wherein the removal of cobalt forms a groove in the cobalt-containing magnetic film; and means for depositing a non-magnetic matrix in one or more of the grooves in the cobalt-containing magnetic film layer groove using a second electrolyte solution comprising a substantially similar electrolytic composition as the first electrolyte solution used for the selective removal of cobalt; and means for depositing a carbon overcoat (COC) over one or more of the grooves in the cobalt-containing magnetic film layer, wherein the second electrolyte solution comprises a $H_2PtCl_6$ solution and the electrochemical cell is configured to control the rate of deposition of the non-magnetic matrix through application of an amount of current sufficient to adjust an electric potential of the electrolyte solution, and wherein the electrochemical cell is configured to control the rate of selective removal of cobalt through application of an amount of current sufficient to adjust an electric potential of the first electrolyte solution.

18. The apparatus of claim 17, wherein the second electrolyte solution comprises a $H_2PtCl_6$ solution and the electrochemical cell is configured to control the rate of deposition of the non-magnetic matrix through application of an amount of current sufficient to adjust an electric potential of the electrolyte solution to approximately −0.4 V vs. saturated calomel electrode (SCE), and wherein the electrochemical cell is configured to control the rate of selective removal of cobalt through application of an amount of current sufficient to adjust an electric potential of the first electrolyte solution to approximately 0.3 V vs. SCE.

19. The apparatus of claim 17, wherein the non-magnetic matrix comprises platinum.

20. The apparatus of claim 17, wherein the second electrochemical cell is configured to perform electrodeposition and the non-magnetic matrix comprises a metal or alloy selected from the group consisting of platinum, ruthenium, nickel, phosphorus, and copper.

\* \* \* \* \*